United States Patent
Liu et al.

(10) Patent No.: US 8,432,820 B2
(45) Date of Patent: Apr. 30, 2013

(54) RADIO AND BANDWIDTH AWARE ROUTING METRIC FOR MULTI-RADIO MULTI-CHANNEL MULTI-HOP WIRELESS NETWORKS

(75) Inventors: Hang Liu, Yardley, PA (US); Lin Luo, North Brunswick, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 404 days.

(21) Appl. No.: 12/449,040

(22) PCT Filed: Feb. 7, 2007

(86) PCT No.: PCT/US2007/003304
§ 371 (c)(1),
(2), (4) Date: Jul. 21, 2009

(87) PCT Pub. No.: WO2008/097221
PCT Pub. Date: Aug. 14, 2008

(65) Prior Publication Data
US 2010/0074194 A1    Mar. 25, 2010

(51) Int. Cl.
*H04L 12/26* (2006.01)
(52) U.S. Cl.
USPC ....................................................... 370/252
(58) Field of Classification Search .......... 370/235, 370/241, 248, 351, 229–232, 236, 252–253, 370/431, 433, 437, 462–465, 480–481, 496
See application file for complete search history.

(56) References Cited

U.S. PATENT DOCUMENTS

| | | | |
|---|---|---|---|
| 5,542,005 A * | 7/1996 | Shimeki et al. | 382/155 |
| 6,760,314 B1 * | 7/2004 | Iwata | 370/254 |

(Continued)

FOREIGN PATENT DOCUMENTS

| | | |
|---|---|---|
| JP | 10276208 A | 10/1998 |
| RU | 2281617 | 8/2006 |

(Continued)

OTHER PUBLICATIONS

Sheu et al., IEEE P802.11 Wireless LANs, Nov. 7, 2005, IEEE, all pages.*

(Continued)

*Primary Examiner* — Omar Ghowrwal
(74) *Attorney, Agent, or Firm* — Robert D. Shedd; Jeffrey M. Navon; Catherine A. Cooper

(57) ABSTRACT

A method and system are described for establishing an end-to-end route for data to traverse a wireless network, including calculating a link cost function, calculating a quantized link cost function using the calculated link cost, function, calculating a quantized cost of each of a plurality, of end-to-end routes for data to traverse the wireless network, wherein the plurality of end-to-end routes include routes between a same set of nodes in the wireless network, wherein, the quantized cost of each of the plurality of end-to-end routes for data to traverse the wireless network is performed using the quantized link cost function and selecting one of the plurality of end-to-end routes, for data to traverse the wireless network based on the quantized cost of each of the plurality of end-to-end routes. Also described is a node in a wireless network configured to participate in the establishment of a bi-directional end-to-end route for data to traverse the wireless network.

30 Claims, 8 Drawing Sheets

U.S. PATENT DOCUMENTS

| | | | |
|---|---|---|---|
| 7,616,575 | B2 | 11/2009 | Padhye et al. |
| 7,764,617 | B2 | 7/2010 | Cain et al. |
| 2002/0049561 | A1 | 4/2002 | Garcia-Luna-Aceves |
| 2003/0202469 | A1* | 10/2003 | Cain .............................. 370/230 |
| 2004/0093426 | A1 | 5/2004 | Sahasrabudhe et al. |
| 2004/0185887 | A1 | 9/2004 | Wolman et al. |
| 2004/0219922 | A1 | 11/2004 | Gage et al. |
| 2006/0120329 | A1* | 6/2006 | Kim et al. ...................... 370/331 |
| 2006/0153081 | A1 | 7/2006 | Simonsson et al. |
| 2008/0095163 | A1* | 4/2008 | Chen et al. .................... 370/392 |
| 2010/0172249 | A1* | 7/2010 | Liu ................................ 370/252 |

FOREIGN PATENT DOCUMENTS

| | | |
|---|---|---|
| WO | WO2004073268 | 8/2004 |
| WO | WO2005096566 | 10/2005 |
| WO | WO2007053141 | 5/2007 |

OTHER PUBLICATIONS

Apostolopoulos et al.: "QoS Routing Mechanisms and OSPF Extensions," IETF Standard-Working-Draft, Internet Engineering Task Force, Dec. 23, 1998, pp. 1-47, XP015013814.

Draves et al.: "Routing in Multi-Radio, Multi-Hop Wireless Mesh Networks," Proceedings of the 10$^{th}$. Annual International Conference on Mobile Computing and Networking (MobiCom '04), Sep. 26-Oct. 1, 2004, Philadelphia, PA, USA, XP-001235027.

Lea et al.: "Quantization, state reduction and cost-based admission and routing," Computer Communications, Elsevier Science B.V., vol. 19, No. 13, Nov. 1, 2006, pp. 1051-1064, XP004052789.

Lea et al.: "Quantization and Cost Computation of MDP-Based Admission and Routing," Proceedings of IEEE Conference on computer communication, Networking the next generation (Infocom 1996), San Francisco, vol. 2, Conf. 15, Mar. 24-28, 1996, pp. 1004-1011, XP010158168.

Li et al.: "Three Load Metrics for Routing in Ad Hoc Networks," IEEE 60$^{TH}$ Vehicular Technology Conference, Los Angeles, CA, USA, Sep. 26-29, 2004, pp. 2764-2768, XP010787157.

Zhao et al.: "PARMA: A PHY/MAC Aware Routing Metric for Ad-Hoc Wireless with Multi-Rate Radios," IEEE 6$^{th}$ International Symposium on a World of Wireless Mobile and Multimedia Networks, Jun. 13-16, 2005, Italy, pp. 286-292, XP010811092.

International Search Report, dated Dec. 6, 2007.

* cited by examiner

Computer Platform

RADIO AND BANDWIDTH AWARE ROUTING METRIC FOR MULTI-RADIO MULTI-CHANNEL MULTI-HOP WIRELESS NETWORKS

This application claims the benefit, under 35 U.S.C. §365 of International Application PCT/US20037/003,304, filed 7 Feb. 2007, which was published in accordance with PCT Article 21(2) on 14 Aug. 2008, in English.

FIELD OF THE INVENTION

The present invention relates to a radio and traffic aware routing metric for wireless networks and specifically to a method and apparatus for selecting the route or path for data to traverse a wireless mesh network wherein one or more nodes have multiple radios, each radio operating on one or more different channels, or wherein one or more nodes have a single radio operating on one or more channels.

BACKGROUND OF THE INVENTION

Most of current mesh routing protocols use the minimum hop count as the metric to make path/route selection decisions. As used herein "/", denotes alternative names for the same or similar components. With this approach, the quality of radio links, the traffic load and the available bandwidth of the links are not considered. The route with the minimum number of hops is selected to forward the data, which is in the form of packets or frames. However, minimal hop count routes can have poor performance because the routes tend to include radio links between distant nodes and the quality of links along the route may not be good. Radio links with a long physical span can be lossy, incurring a number of retransmissions and a low physical layer data rate. Many radio transmission systems, for example IEEE 802.11 and IEEE 802.16 radios, adapt the physical layer data rate depending on the link quality. This actually results in poor throughput and reduces the efficiency of network utilization compared to selecting a path with more hops but better link quality.

In the prior art, a metric called "expected transmission count" (ETX) has been used as a routing metric. The ETX estimates the expected number of MAC layer transmissions needed to successfully deliver a packet through a wireless link. The route with the lowest sum of the ETX's of all links along the path (the path with the lowest ETX cost) is selected. The ETX captures the effects of packet loss rates of a link but does not take different transmission rates and the available bandwidth of the links into account.

In another reported prior art scheme, a metric called "expected transmission time" (ETT) has been proposed to improve the ETX by considering the difference of link transmission rates. The ETT of a link is defined as the expected MAC layer duration for a successful transmission of a packet over the link. The cost of a route is the sum of the ETT's of all links along the route. The ETT takes the impact of different link transmission rates into account. However, it does not fully capture the impact of the traffic load and the available bandwidth of the link as well as the interference in the networks due to the shared medium. A heavily loaded link may be selected to include in the route so that these links become more loaded and the congestion occurs.

In a previous related application, a weighted radio and traffic load aware (WRALA) routing metric was described. The described metric captures the impact of various aspects of a wireless link in mesh networks, including the radio transmission rate, loss rate, traffic load and available bandwidth of the link as well as the interference due to the shared medium in the networks.

However, none of the above routing metrics consider the impact of multi-radio multi-channel on the routing performance. In a mesh network, a node/mesh point may be equipped with multiple radios and each of the radios can operate on a different channel/frequency to enhance network capacity. Unlike a node with a single radio, a multi-radio multi-channel node can receive data packets on one channel and simultaneously transmit data packets on another channel. It is, therefore, preferable to select a relay node with multiple radios each radio operating on a different channel. Furthermore, even with a single radio, a node having a radio that can operate on multiple channels may receive data on one channel and then switch to another channel to forward/relay/transmit the data.

It would be advantageous to have a system for selecting a route for data to traverse a mesh network that uses a metric that is not only traffic and bandwidth aware but also captures the impact of having one or more nodes having multiple radios, each radio operating on a different channel, or where one or more nodes have a single radio operating on multiple channels

SUMMARY OF THE INVENTION

In multi-radio multi-channel wireless mesh networks, a single-hop or multi-hop path needs to be selected to forward data in the form of packets or frames from a source node/mesh point to a destination node/mesh point. The path/route selection is based on a metric. Such a routing metric is important for optimizing the design of routing and forwarding mechanisms in mesh networks. The present invention describes a radio and bandwidth aware metric that captures the impact of multi-radio and multi-channel to the routing performance and an apparatus and method that uses the metric for selecting a route for data to traverse a mesh network. It should be noted that the metric in the present invention is not limited to a wireless mesh network although a wireless mesh network is used as an example to explain the present invention. The present invention can also be used for other network topologies, for example, tree type of multi-hop wireless networks for selecting the route between a node and the tree root.

The value of the routing metric may change frequently due to dynamics of link quality and traffic load, which may lead to route instability. It is important to ensure the route stability with good routing performance even in the face of rapidly changing link quality and load variations. Therefore the present invention also describes a method to achieve quick responses to link state and network topology changes while maintaining the route stability by quantizing the routing metric.

A method and system are described for establishing an end-to-end route for data to traverse a wireless network, including calculating a link cost function, calculating a quantized link cost function using the calculated link cost function, calculating a quantized cost of each of a plurality of end-to-end routes for data to traverse the wireless network, wherein the plurality of end-to-end routes include routes between a same set of nodes in the wireless network over different channels, wherein the quantized cost of each of the plurality of end-to-end routes for data to traverse the wireless network is performed using the quantized link cost function and selecting one of the plurality of end-to-end routes for data to traverse the wireless network based on the quantized cost of each of the plurality of end-to-end routes. Also described is a node in a wireless network configured to participate in the establishment of a bi-directional end-to-end route for data to traverse the wireless network, including means for measuring the quality and the utilization of each channel of the node, each node having multiple channels, means for calculating routing metrics using the measured quality and utilization of the each channel, means for updating routing table with the calculated routing metrics, means for selecting the bi-directional end-to-end route for data to traverse the wireless network based on the routing table. Also described are a method and system for establishing an end-to-end route for data to traverse a wireless network, including calculating a link cost function, calculating a cost of each of a plurality of end-to-end routes for data to traverse the wireless network, wherein the plurality of end-to-end routes include routes between a same set of nodes in the wireless network over different channels, wherein the cost of each of the plurality of end-to-end routes for data to traverse the wireless network is performed using the link cost function and selecting one of the plurality of end-to-end routes for data to traverse the wireless network based on the cost of each of the plurality of end-to-end routes.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
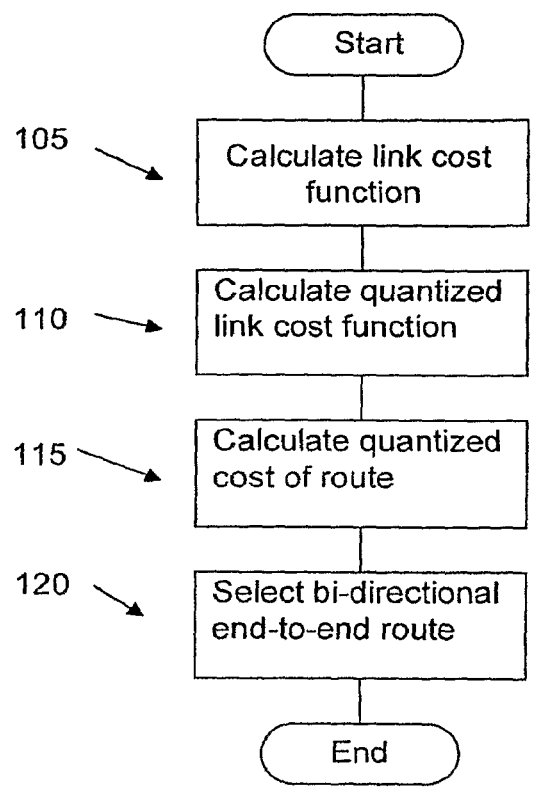
FIG. 1 is a flowchart of the method of establishing a bi-directional end-to-end route in accordance with the principles of the present invention.

Let $T_{oh}$ denote a parameter representing the protocol overhead at the medium access control (MAC) and physical layers. Let S denote the test frame/packet size. Given an IEEE 802.11a radio transmission system, for example, $T_{oh}$ can be 185 μs. For simplicity, $T_{oh}$ may also be set to 0. The size of test packet S can be a pre-determined and pre-configured constant, for example, 8224 bits. It is also possible to choose the test frame/packet size as the average size or the maximum size of the packets transmitted by a node. Furthermore, let R denote the link data rate at which the node transmits data in the form of a packet or frame of the standard size S under current channel conditions. The link data rate depends on the local implementation of the link rate adaptation. Let $E_r$ denote the packet/frame error rate if the node transmits packets/frames (data) of the standard size S at the transmission rate R. Data is made up of bits of information. Data is formed into packets or frames, for ease of transmission. $E_r$ can be measured and/or estimated by a node in the mesh network locally. Let ρ denote the load/utilization of the channel for the link that is related to the available bandwidth of the channel. The routing metric of the present invention is a weighted Radio and Bandwidth Aware (RABA) link cost function. The RABA cost function for a radio link L can be calculated as $$RABA(L) = \left(T_{oh} + \frac{S}{R}\right) \times W_1(\rho) \times W_2(E_r) \quad (1)$$

where $W_1(\rho)$ and $W_2(E_r)$ are two weight functions of channel utilization ρ and packet/frame error rate Er, respectively. Some possible form of $W_1(\rho)$ are:

(a) $W_1(\rho)=1$

In this case, all links are weighted equally in terms of channel utilization.

(b) $W_1(\rho) = \frac{1}{1-\rho}$

In this case, links are given weights increasing with their channel load/utilization.

(c) $W_1(\rho) = \begin{cases} 1 & \rho \leq \rho_0 \\ \frac{1}{1-\rho} & \rho_0 < \rho \leq \rho_{max} \\ \infty & \rho > \rho_{max} \end{cases}$ In this case, links with channel load/utilization less than $\rho_0$ are weighted equally. Links with channel load/utilization between $\rho_0$ and $\rho_{max}$ are given weights increasing with their channel load/utilization. Links with channel utilization greater than $\rho_{max}$ are not considered in the path selection because their cost is infinite. Generally, the system designer can choose suitable values of $\rho_{max}$ and $\rho_0$ depending on some targeted network revenue and application requirements.

Similarly, some possible forms of $W_2(E_r)$ are:

(a) $W_2(Er)=1$;

In this case, all links are weighted equally in terms of packet error rate.

(b) $W_2(Er) = \frac{1}{1-Er}$

In this case, links are given weights increasing with their packet error rate.

(c) $W_2(Er) = \begin{cases} 1 & Er \leq E_0 \\ \frac{1}{1-Er} & E_0 < Er \leq E_{max} \\ \infty & Er > E_{max} \end{cases}$ In this case, links with packet/frame error rate less than $E_0$ are weighted equally. Links with packet error rate between $E_0$ and $E_{max}$ are given weights increasing with their packet error rate. Links with packet error rates greater than $E_{max}$ are not considered in the path selection because its cost is infinite. Generally, the system designer can choose suitable values of $E_0$ and $E_{max}$ depending on some targeted network revenue and application requirements.

It is noted that the weight functions $W_1(\rho)$ and $W_2(Er)$ are not limited to the above forms. They can be in other forms as well.

The RABA link cost function represents a composite routing metric which captures the amount of radio resource consumed by sending a data packet/frame over a particular link and the load and available bandwidth on the link. The RABA link cost function takes the inter-flow interference in the shared wireless medium into account. A path/route with higher link data rate, higher available bandwidth and less packet error rate is favoured in the path/route selection.

Both the link/channel quality and load varies so the value of RABA changes frequently. If RABA is directly used as the routing metric, the path may change frequently, leading to route instability. The present invention also includes a method to not only achieve quick response to the link state and network topology changes but also maintain route stability. In order to enhance route stability, a quantized version of RABA is used as the link cost function. The quantized RABA (QRABA) for a link L can be formulated as $$QRABA(L) = \text{Ceiling}\left(\frac{M \times RABA(L)}{Q}\right) \quad (2)$$

or $$QRABA(L) = \begin{cases} \text{Ceiling}\left(\frac{M \times RABA(L)}{Q}\right) & \text{Ceiling}\left(\frac{M \times RABA(L)}{Q}\right) \leq M \\ \infty & \text{Ceiling}\left(\frac{M \times RABA(L)}{Q}\right) > M \end{cases} \quad (3)$$

or $$QRABA(L) = \begin{cases} \text{Ceiling}\left(\frac{M \times RABA(L)}{Q}\right) & \text{Ceiling}\left(\frac{M \times RABA(L)}{Q}\right) \leq M \\ M+1 & \text{Ceiling}\left(\frac{M \times RABA(L)}{Q}\right) > M \end{cases} \quad (4)$$

where M is the number of quantization levels and Q is the quantization factor. Generally, the system designer can choose suitable values of M and Q depending on some targeted tradeoffs of route stability and network response time to link state and topology changes. For example, the desired quantization level, M, can be 16 and Q can be the maximum value or the range of RABA(L). In order to use a limited number of bits (a fixed size field) to represent the value of QRABA, the value of QRABA can be truncated to M+1 if it is greater than M+1.

A node can estimate the load/utilization of the channel used by a link to its neighbors. One possible method to estimate the channel load/utilization is to use the channel busy time. Due to the shared nature of wireless channels, the channel is busy when any node within the interference range performs transmission. When a node uses the channel to transmit data in the form of a frame or packet over a channel then this channel is busy. Other nodes within the interference range cannot simultaneously transmit with the same frequency or a collision occurs and the transmitted frames/packets (data) would be in error. Furthermore, a node may receive a control message from another node, in which the node reserves the channel for a period of time. The channel is busy if a node is in one of the following states. First, the node is transmitting or receiving data using this channel/frequency. Second, the node receives a control/management message from another node, which reserves the channel for a period of time. Third, the node senses a busy carrier with signal strength larger than a threshold on this channel/frequency. If the estimated channel busy time is $T_{busy}$ during a measurement period $T_p$, the channel load is $\rho = T_{busy}/T_p$.

A path from a source node to a destination node includes multiple links Li and intermediate nodes Ni. Li represents the link between node Ni and its previous hop Ni−1 along the path/route. The RABA cost of a path P is calculated as follows, $$RABA(P) = \sum_{Li \in P} [\alpha_1(f_{Li}, f_{Li+1}) \times RABA(Li) + \alpha_2(f_{Li}, f_{Li+1})] \quad (5)$$

If the quantization is used to improve the route stability, the QRABA cost of a path P is calculated as $$QRABA(P) = \sum_{Li \in P} [\alpha_1(f_{Li}, f_{Li+1}) \times QRABA(Li) + \alpha_2(f_{Li}, f_{Li+1})] \quad (6)$$

where link Li+1 is the next link following link Li along the path P, and $f_{Li}$ and $f_{Li+1}$ represent the channels/frequencies assigned for links Li and Li+1, respectively. $\alpha_1(f_{Li}, f_{Li+1})$ and $\alpha_2(f_{Li}, f_{Li+1})$ are two channel change weight (CCW) functions, depending on the channels/frequencies assigned for two consecutive links along the path. Some possible form of $\alpha_1(f_{Li}, f_{Li+1})$ are (a) $\alpha_1(f_{Li}, f_{Li+1}) = 1$ In this case, all links are weighted equally in terms of channels assigned for transmission.

(b) $\alpha_1(f_{Li}, f_{Li+1}) = \begin{cases} a_1 & \text{if } Li = LastLink \\ b_1 & \text{if } f_{Li} = f_{Li+1} \\ c_1 & \text{if } f_{Li} \neq f_{Li+1} \text{ and single-radio} \\ d_1 & \text{if } f_{Li} \neq f_{Li+1} \text{ and multi-radio} \end{cases}$ In this case, for the LastLink along the path, i.e. the link over which the destination node receives the packet/frame (data), the CCW function $\alpha_1(f_{Li}, f_{Li+1})$ is equal to $a_1$. Note that the destination node will not forward the data again. If two consecutive links Li and Li+1 along the path use the same channel/frequency, i.e. an intermediate node Ni receives data from link Li with channel/frequency $f_{Li}$ and forwards/transmits data on link Li+1 with channel/frequency $f_{Li+1} = f_{Li}$, the CCW function $\alpha_1(f_{Li}, f_{Li+1})$ is equal to $b_1$. If two consecutive links Li and Li+1 along the path use different channels/frequencies but with the same radio, i.e. an intermediate node Ni receives data from link Li with a channel/frequency $f_{Li}$ using a radio interface and forwards/transmits data on link Li+1 with a channel/frequency $f_{Li+1} \neq f_{Li}$ using the same radio interface, the CCW function $\alpha_1(f_{Li}, f_{Li+1})$ is equal to $c_1$. If two consecutive links Li and Li+1 along the path use different channels/frequencies and with different radios, i.e. an intermediate node Ni receives data from link Li with channel/frequency $f_{Li}$ using a radio interface and forwards/transmits data on link Li+1 with a channel/frequency $f_{Li+1} \neq f_{Li}$ using a different radio interface, the CCW function $\alpha_1(f_{Li}, f_{Li+1})$ is equal to $d_1.\alpha_1$, $b_1$, $c_1$ and $d_1$ are design parameters which can be predetermined by a system designer. For example, $\alpha_1=1$, $b_1=2$, $c_1=1.5$ and $d_1=1$. Paths that use the same channel/frequency and the same radio on consecutive links are given a higher weight/cost than paths that use different channels/frequencies and different radios on consecutive links.

Similarly, some possible forms of $\alpha_2(f_{Li}, f_{Li+1})$ are:

(a) $\alpha_2(f_{Li}, f_{Li+1})=0$

In this case, all links are weighted equally in terms of channels assigned for transmission.

$$(b)\ \alpha_2(f_{Li}, f_{Li+1}) = \begin{cases} a_2 & \text{if } Li = LastLink \\ b_2 & \text{if } f_{Li} = f_{Li+1} \\ c_2 & \text{if } f_{Li} \neq f_{Li+1} \text{ and single-radio} \\ d_2 & \text{if } f_{Li} \neq f_{Li+1} \text{ and multi-radio} \end{cases}$$

In this case, for the LastLink along the path, i.e. the link that the destination receives the data, the CCW function $\alpha_2(f_{Li}, f_{Li+1})$ is equal to $\alpha_2$. Note that the destination node will not forward the data again. If two consecutive links Li and Li+1 along the path use the same channel/frequency, i.e. the intermediate node Ni receives data from link Li with channel/frequency $f_{Li}$ and forwards/transmits data on link Li+1 with channel/frequency $f_{Li+1}=f_{Li}$, the CCW function $\alpha_2(f_{Li}, f_{Li+1})$ is equal to $b_2$. If two consecutive links Li and Li+1 along the path use different channels/frequencies but with the same radio, i.e. an intermediate node Ni receives data from link Li with a channel/frequency $f_{Li}$ using a radio interface and forwards/transmits data on link Li+1 with a channel/frequency $f_{Li+1} \neq f_{Li}$ with the same radio interface, the CCW function $\alpha_2(f_{Li}, f_{Li+1})$ is equal to $c_2$. If two consecutive links Li and Li+1 along the path use different channels/frequencies and with different radios, i.e. an intermediate node Ni receives data from link Li with channel/frequency $f_{Li}$ using a radio interface and forwards/transmits data on link Li+1 with a channel/frequency $f_{Li+1} \neq f_{Li}$ using a different radio interface, the CCW function $\alpha_2(f_{Li}, f_{Li+1})$ is equal to $d_2.\alpha_2$, $b_2$, $c_2$ and $d_2$ are design parameters which can be predetermined by the system designer. For example, $\alpha_2=0$, $b_2=5$, $c_1=3$, $d_1=0$. Paths/routes that use the same channel/frequency and the same radio on consecutive links are given a higher weight/cost than paths/routes that use different channels/frequencies and different radios on consecutive links It is noted that the CCW functions $\alpha_1(f_{Li}, f_{Li+1})$ and $\alpha_2(f_{Li}, f_{Li+1})$ are not limited to the above forms. They can be in other forms.

The CCW functions $\alpha_1(f_{Li}, f_{Li+1})$ and $\alpha_2(f_{Li}, f_{Li+1})$ in the path/routing metric capture the impact of multi-radio multi-channels on network capacity, inter- and intra-flow interference. Paths/routes that use different channels and multiple radios are preferred in the path/route selection scheme of the present invention. Note that single radio and single channel is a special case of multi-radio and multi-channel in the present invention.

FIG. 1 is a flowchart of the method of establishing a bi-directional end-to-end route in accordance with the principles of the present invention. At 105 the link cost function as described above is calculated. The results of this calculation are used to calculate the quantized link cost function at 110. At 115 the quantized cost of routes is calculated using the quantized link costs. The best bi-directional end-to-end route for data to traverse a wireless network is selected at 120 based on the calculated cost of the routes.

Figure 2:
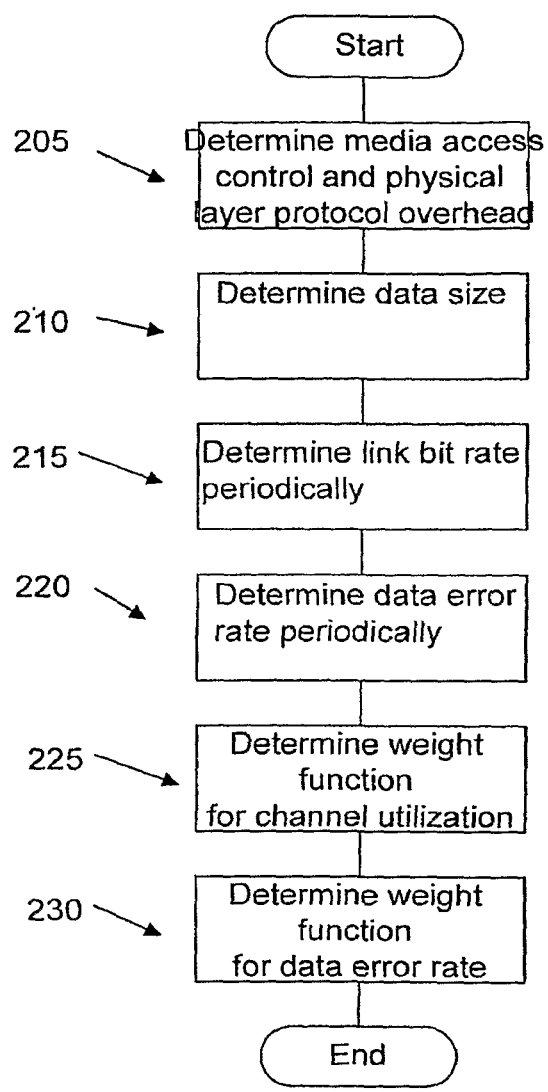
FIG. 2 is a flowchart of the calculation of the link cost function act of the present invention.

FIG. 2 is a flowchart of the calculation of the link cost function act of the present invention. At 205 the protocol overhead for the media access control and physical layers is determined. The packet/frame (data) size is determined at 210. At 215 the link data rate is determined periodically. The packet/frame error rate is determined periodically at 220. At 225 the weight function for channel utilization is determined. That is, the weight function may be selected from a plurality of available weight functions that are available and the weight to be applied for the calculation of the link cost function for a particular link is determined. The weight function for the packet/frame error rate is then determined at 230. Once again, the weight function may be selected from a plurality of available weight functions that are available and the weight to be applied for the calculation of the link cost function for a particular link is determined.

Figure 3:
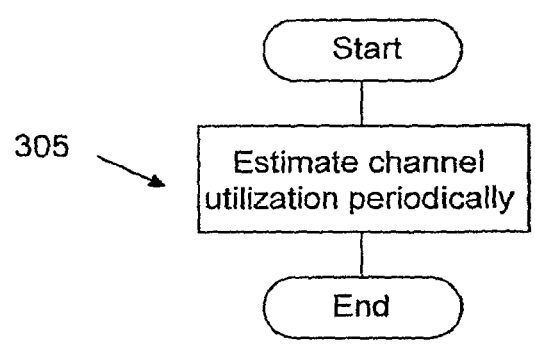
FIG. 3 is a flowchart of the determination of the weight function for the channel utilization of the present invention.

FIG. 3 is a flowchart of the determination of the weight function for the channel utilization of the present invention. At 305 the channel utilization is estimated periodically.

Figure 4:
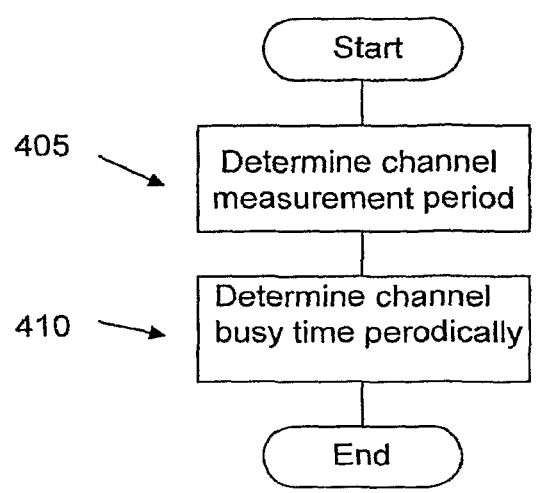
FIG. 4 is a flowchart of the channel estimation of the present invention.

FIG. 4 is a flowchart of the channel estimation of the present invention. At 405 the channel measurement period is determined and then at 410 the channel busy time is determined periodically. Both of these determinations are used to periodically estimate the channel utilization.

Figure 5:
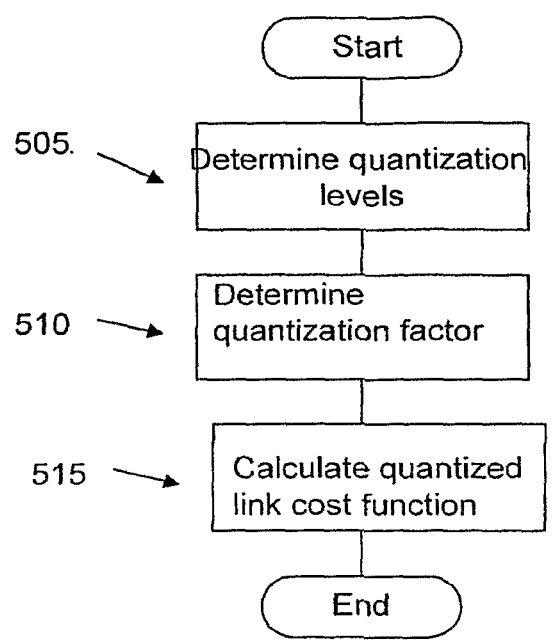
FIG. 5 is a flowchart of the calculation of the quantized link cost function of the present invention.

FIG. 5 is a flowchart of the calculation of the quantized link cost function of the present invention. At 505 the number of quantization levels is determined and the quantization factor is determined at 510. Both of these values are used to calculate the quantized link cost function at 515.

Figure 6:
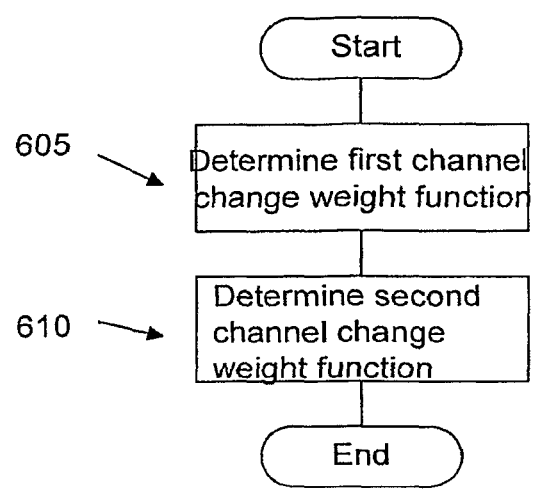
FIG. 6 is a flowchart of the calculation of the quantized cost of the routes of the present invention.

FIG. 6 is a flowchart of the calculation of the cost of the routes of the present invention. At 605 the first channel change weight function is determined and the second channel change weight function is determined at 610. Both of these values are used in the calculation of the cost of the routes.

The QRABA path/routing metric of the present invention can be applied to select the path/route in wireless mesh networks. The QRABA routing metric can be incorporated into the design of routing protocols/algorithms, including on-demand, proactive, and hybrid routing protocols to select the route/path. The path/route with the minimum value of QRABA among the paths between a source node/mesh point and a destination node/mesh point is selected. If there are multiple paths/routes with the same minimum value of the QRABA, the path with minimum hop count is selected.

Figure 7:
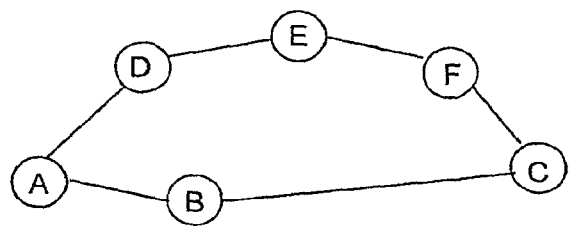
FIG. 7 is a schematic diagram of a wireless mesh network.

Referring to FIG. 7, an example mesh network is shown to help understand the present invention. For example, a path from node A to node C consists of links AB, BC and an intermediate node B.

For example, if the QRABA path metric is incorporated into a proactive link state routing protocol such as Optimized Link State Routing (OLSR) protocol and Open Shortest Path First (OSPF) protocol, the QRABA link cost for each of links in the mesh network needs to be estimated. A node in the mesh network locally estimates the QRABA link costs to each of its neighbors and announces the QRABA cost and the channel/frequency of the link to each of Its neighbors to other nodes in the network as part of link state information in the routing control messages. Each node maintains a routing/forwarding table that allows it to forward data in the form of packets or frames destined for the other nodes in the network. The routing/forwarding table is generated and updated based on the cached link state information generated by each node. Using the QRABA of the present invention as the path metric, a node calculates the route/path to a destination using equation (6). As an example shown in FIG. 7, node A has two paths to destination C, A-B-C and A-D-E-F-C. The quality of link BC is very bad and/or the load on link BC is very high and/or the available bandwidth of link BC is very small and/or the same channel/frequency assigned to link AB and link BC so that the QRABA cost for path A-B-C is larger than that for path A-D-E-F-C. Even if the path A-B-C has fewer hops than the path A-D-E-F-C, the path A-D-E-F-C would be selected by node A to forward data in the form of packets or frames destined for node C. In the node A's routing table, the next hop will be node D, not node B, for destination C.

Another example is that the QRABA path metric is incorporated into an on-demand routing protocol such as Ad-Hoc On-Demand Distance Vector (AODV) protocol. The path with the least value of QRABA path cost is discovered, created and maintained when a source node wants to send data in the form of packets or frames to some destination node. Each node has a mechanism to determine the QRABA link cost to each of its neighbors and knows the channel/frequency used for each of the links dynamically or statically. When a source node wants to send data to some destination node and does not have a valid route to this destination, the source node initiates a route discovery by flooding the network with a Route Request (RREQ) message to all the nodes in the network. In addition to other information, the destination address, the routing metric field and the hop count field are contained in the RREQ message. Note that each node may receive multiple copies of the same RREQ that is originated by the source node. Each of these RREQs traverses a unique path from the source node to the receiving node. The receiving node may be the destination node or may be an intermediate node. When an intermediate node Ni receives a RREQ it updates the metric field based on equation (6). Specifically, this intermediate node Ni adds the weighted link cost between the node from which it received RREQ message and itself, $\alpha_1(f_{Li}, f_{Li+1}) \times QRABA(L_i) + \alpha_2(f_{Li}, f_{Li+1})$, to the value in the RREQ metric field. The channel change weight functions $\alpha_1(f_{Li}, f_{Li+1})$ and $\alpha_2(f_{Li}, f_{Li+1})$ depend on the channel/frequency of the link and radio interface to receive the RREQ as well as the link and radio interface to forward (re-flood) the network with RREQs. The intermediate node establishes its reverse route to the source node if it does not have a reverse route, or updates its reverse route to the source node if this RREQ represents a new route that is better than the current route to the source node. The intermediate node forwards (re-floods) the updated RREQ. The metric field in the re-flooded RREQ is the updated metric, which reflects the cumulative metric of the route between the RREQs source node and the forwarding node.

When the destination node receives a RREQ it updates the metric field based on equation (6). The destination node creates a reverse route to the source node in its routing table if there is no route to the source node in its routing table. The destination node updates its current reverse route to the source node if the RREQ provides a new route that is better than the current reverse route to the source node. After creating or updating its reverse route to the source node, the destination node sends a unicast Route Reply (RREP) message towards the source node. In addition to other information, the RREP message contains a metric field to carry the metric information. The RREP establishes a forward route to the destination node in the intermediate nodes and eventually in the source node. Note that a node (source and/or intermediate) may receive multiple RREPs for the same destination node. When an intermediate node receives the RREP message, it updates the metric information in its routing table according to equation (6). The intermediate node then establishes a route to the destination node, if it does not have a route to the destination node, or updates its current route to the destination node if the new RREP provides a route better than the current route to the destination node. If a route is created or modified, the intermediate node forwards the RREP in unicast to the next upstream (towards the source node) node along the established reverse route. The metric field in the RREP is the updated metric, which reflects the cumulative metric of the route to the destination node from the forwarding node. After a RREP has been sent, if the destination node receives further RREQs with a better metric, then the destination updates its route to the source node and also sends a fresh RREP to the source node along the updated route. Thus a bidirectional, optimal end-to-end metric route with the optimal value of QRABA path metric is established between the source node and destination node. In an alternative embodiment, the intermediate nodes with a valid route to the destination node can also send a unicast RREP message back to the source node.

The QRABA path metric of the present invention can be applied to select the path in multi-hop wireless networks based on a tree topology. The QRABA route metric can be incorporated into the design of tree-based routing protocols/algorithms to build the topology tree rooted at a root node and select the parent and path. A node selects its parent with a minimum value of QRABA between the root and itself.

A root node periodically sends root announcement (RANN) messages or special route request (RREQ) messages with the destination node address to all the nodes in the network. In addition to other information, the RANN and RREQ contain the metric field and sequence number field. The metric field is initialized and the sequence number is increased when the root sends a new RANN or RREQ. When any node in the network receives an RANN or RREQ with the destination node address to all the nodes, it updates the metric field based on equation (6). The node creates its routing/forwarding information to the root if it has no information regarding routing to the root node. The node from which the RANN or RREQ is received is its parent to the root node. Note that each node may receive multiple copies of RANN or RREQ messages. The node updates its parent and routing/forwarding information to the root if the RANN or RREQ represents a new route better than the current route to the root node. For example, the node updates its current parent and routing/forwarding information to the root node if the RANN or RREQ contains a greater sequence number, or the sequence number is the same as the current route and the RANN or RREQ message offers a metric better than the current route to the root node. After creating or updating its parent and routing/forwarding information to the source node, the node forwards (re-floods) the updated RANN or RREQ messages over the network. The information about the presence of root(s) and metrics to available root(s) is disseminated to all nodes in the network. A node may send a registration (REGS) or a route reply (RREP) message or a route request (RREQ) to the root node after it receives RANN or RREQ messages with the destination node address to all nodes or when it has data to send to the root node and needs bi-directional path to the root node. The REGS or RREP or RREQ messages establish/update the route from the root node to this node.

Figure 8:
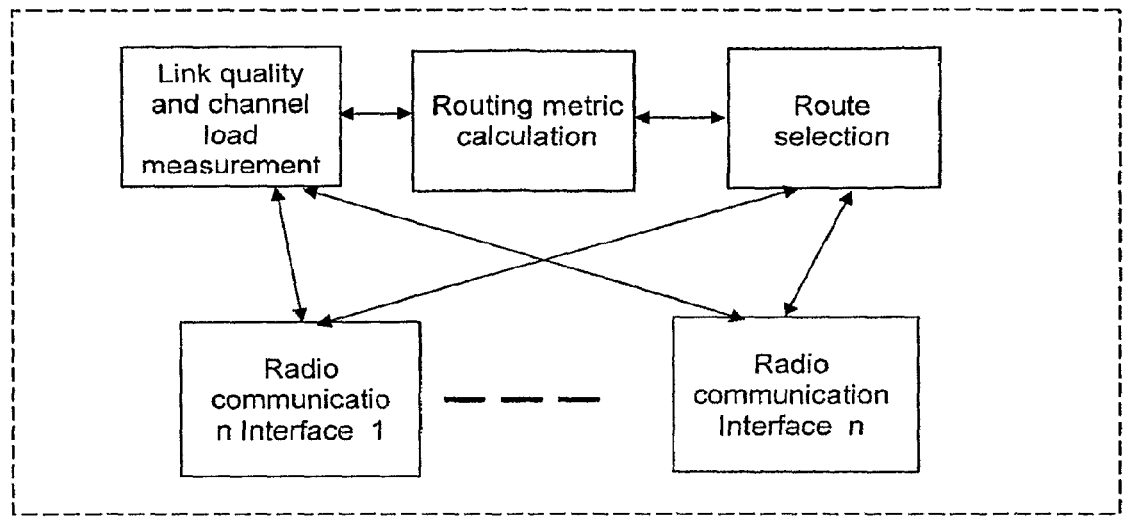
FIG. 8 is a block diagram of a node of a wireless mesh network having modules to operate in accordance with the principles of the present invention.

FIG. 8 is a block diagram illustrating the details of a node using the routing metric of the present invention. The node consists of, among others, a route selection module 815, a link quality and channel load/utilization measurement module 805, a routing metric calculation module 810, and one or more radio communication interface modules 820*a*, . . . 820*n*. The link quality and channel load/utilization measurement module 805 periodically measures the quality and the load/utilization of the link/channel to each of its neighbors via the radio communications interface modules 820a, ... 820n. It provides the measurement results to the routing metric calculation module, which periodically calculates the routing metrics. The routing metrics include the link cost function, the quantized link cost function and the quantized route cost function. Note that a node may have multiple neighbors, multiple radio interfaces, and multiple physical/logical channels and links. The quality and load of all of these links need to be periodically measured by the measurement module. The route selection module executes the routing protocols/algorithms and determines the route and the radio interface to forward data. It also exchanges the routing control messages with other nodes in the network via the radio communication interface modules 820a, ... 820n. Note that a node may have one or more radio communication and other communication interfaces.

In proactive routing protocols, to maintain the route stability while achieving a reasonably quick response to the link state and topology changes, a node may immediately announce the state change for the link to one of its neighbors (neighbor nodes) by flooding the routing control messages if and only if the changes in the RABA metric for this link are greater than a threshold, compared to the value in its last announcement. That is, if and only if (RABA(current)−RABA(last))/RABA(last)×100%>T % , the node immediately floods routing control messages to announce the change in the link state. Otherwise, the route metric changes are announced in next periodic announcement.

Figure 9:
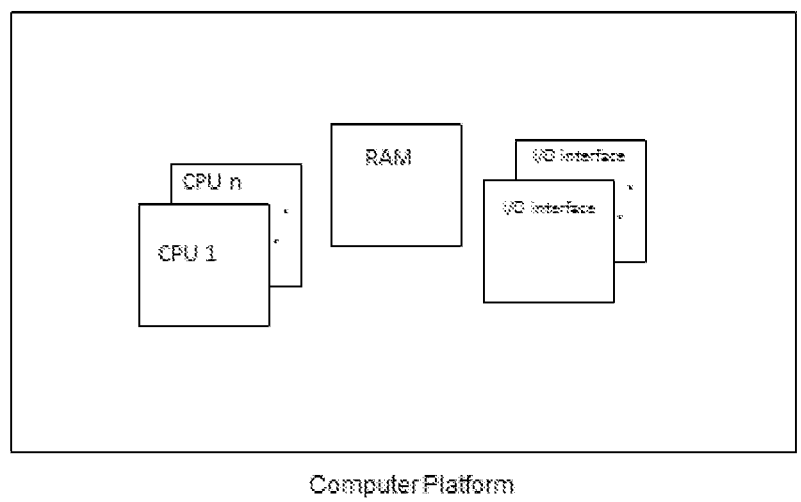
FIG. 9 is a block diagram of an apparatus in which the radio and bandwidth aware link cost function of the present invention is practiced.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform as shown in FIG. 9 having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for establishing an end-to-end route for data to traverse a wireless network comprising a plurality of nodes, said method comprising:

at a node of said plurality of nodes, calculating a link metric function, wherein said link metric function uses media access control and physical layer protocol overhead and data size in said link metric function calculation;

calculating a quantized link metric function using said calculated link metric function;

determining a first channel change weight function, said first channel change weight function depending upon frequencies assigned to two consecutive links along said end-to-end route, wherein said first channel change weight function has a value of 1 if all links are weighted equally in terms of channels assigned for transmission and wherein said first channel change weight function has a first predetermined value if a first link of said two consecutive links is a last link in said end-to-end route, a second predetermined value if a first frequency used for said first link of said two consecutive links and a second frequency used for a second link of said two consecutive links are the same, a third predetermined value if said first frequency used for said first link of said two consecutive links is not the same as said second frequency used for said second link of said two consecutive links and nodes associated with each of said two consecutive links use a single radio interface, and a fourth predetermined value if said first frequency used for said first link of said two consecutive links is not the same as said second frequency used for said second link of said two consecutive links and nodes associated with each of said two consecutive links use multiple radio interfaces;

determining a second channel change weight function, said second channel change weight function depending upon frequencies assigned to two consecutive links along said end-to-end route, wherein said second channel change weight function has a value of 0 if all links are weighted equally in terms of channels assigned for transmission and wherein said second channel change weight function has a first predetermined value if a first link of said two consecutive links is a last link in said end-to-end route, a second predetermined value if a first frequency used for said first link of said two consecutive links and a second frequency used for a second link of said two consecutive links are the same, a third predetermined value if said first frequency used for said first link of said two consecutive links is not the same as said second frequency used for said second link of said two consecutive links and nodes associated with each of said two consecutive links use a single radio interface, and a fourth predetermined value if said first frequency used for said first link of said two consecutive links is not the same as said second frequency used for said second link of said two consecutive links and nodes associated with each of said two consecutive links use multiple radio interfaces;

calculating a quantized metric of each of a plurality of end-to-end routes for data to traverse said wireless network by applying said first channel change weight function and said second channel change weight function to the quantized link metric function, wherein said plurality of end-to-end routes include routes between a same set of nodes in said wireless network; and selecting one of a plurality of end-to-end routes for data to traverse said wireless network based on said quantized metric of each of said plurality of end-to-end routes, wherein said plurality of said end-to-end routes between a same set of nodes in said wireless network over different channels include a plurality of radio interfaces, and further wherein each of said plurality of end-to-end routes is bi-directional.

2. The method according to claim 1, wherein said wireless network is a wireless mesh network.

3. The method according to claim 2, wherein said wireless mesh network is a pro-active network.

4. The method according to claim 3, further comprising:
announcing results of said calculated link metric function as state information in a control message; and
using said calculated link metric function to generate and maintain a routing table.

5. The method according to claim 4, further comprising: immediately announcing said results of said calculated link metric function as state information in a control message if said results are greater than a pre-determined threshold value.

6. The method according to claim 2, wherein said wireless mesh network is an on-demand network.

7. The method according to claim 6, further comprising:
initiating route discovery; and
using said calculated link metric function to generate and maintain a routing table.

8. The method according to claim 2, wherein said wireless mesh network is a hybrid mesh network.

9. The method according to claim 2, wherein said wireless mesh network is based on a tree topology.

10. The method according to claim 9, further comprising:
performing one of transmitting a root announcement and initiating a route discovery, including an initialized metric field and a sequence number field;
updating said metric field;
updating said sequence number field;
updating a routing table; and
establishing a bi-directional end-to end route.

11. The method according to claim 1, further comprising:
determining a media access control and physical layer protocol overhead;
determining a data size;
determining a link data rate periodically;
determining a packet error rate periodically;
determining a weight function for channel utilization; and
determining a weight function for said packet error rate.

12. The method according to claim 11, further comprising determining channel utilization periodically.

13. The method according to claim 12, further comprising:
determining a channel measurement period; and
determining a channel busy time periodically.

14. The method according to claim 1, further comprising:
determining a number of quantization levels; and
determining a quantization factor.

15. A system comprising a wireless network comprising a plurality of nodes, said system for establishing an end-to-end route for data to traverse said wireless network, wherein a node of said system comprises:
at least one central processing unit;
a random access memory;
one or more input/output interfaces; and further comprising:
means for calculating a link metric function, wherein said link metric function uses media access control and physical layer protocol overhead and data size in said link metric function calculation;
means for calculating a quantized link metric function using said calculated link metric function;
means for determining a first channel change weight function, said first channel change weight function depending upon frequencies assigned to two consecutive links along said end-to-end route, wherein said first channel change weight function has a value of 1 if all links are weighted equally in terms of channels assigned for transmission and wherein said first channel change weight function has a first predetermined value if a first link of said two consecutive links is a last link in said end-to-end route, a second predetermined value if a first frequency used for said first link of said two consecutive links and a second frequency used for a second link of said two consecutive links are the same, a third predetermined value if said first frequency used for said first link of said two consecutive links is not the same as said second frequency used for said second link of said two consecutive links and nodes associated with each of said two consecutive links use a single radio interface, and a fourth predetermined value if said first frequency used for said first link of said two consecutive links is not the same as said second frequency used for said second link of said two consecutive links and nodes associated with each of said two consecutive links use multiple radio interfaces;
means for determining a second channel change weight function, said second channel change weight function depending upon frequencies assigned to two consecutive links along said end-to-end route, wherein said second channel change weight function has a value of 0 if all links are weighted equally in terms of channels assigned for transmission and wherein said second channel change weight function has a first predetermined value if a first link of said two consecutive links is a last link in said end-to-end route, a second predetermined value if a first frequency used for said first link of said two consecutive links and a second frequency used for a second link of said two consecutive links are the same, a third predetermined value if said first frequency used for said first link of said two consecutive links is not the same as said second frequency used for said second link of said two consecutive links and nodes associated with each of said two consecutive links use a single radio interface, and a fourth predetermined value if said first frequency used for said first link of said two consecutive links is not the same as said second frequency used for said second link of said two consecutive links and nodes associated with each of said two consecutive links use multiple radio interfaces;
means for calculating a quantized metric of each of a plurality of routes for data to traverse said wireless network by applying said first channel change weight function and said second channel change weight function to the quantized link metric function, wherein said plurality of end-to-end routes include routes between a same set of nodes in said wireless network; and
means for selecting one of a plurality of end-to-end routes for data to traverse said wireless network based on said quantized metric of each of said plurality of end-to-end routes, wherein said plurality of said end-to-end routes between a same set of nodes in said wireless network over different channels include a plurality of radio interfaces, and further wherein each of said plurality of end-to-end routes is bi-directional.

16. The system according to claim 15, wherein said wireless network is a wireless mesh network.

17. The system according to claim 16, wherein said wireless mesh network is a pro-active network.

18. The system according to claim 17, said node further comprising:
means for announcing results of said calculated link metric function as state information in a control message; and
means for using said calculated link metric function to generate and maintain a routing table.

19. The system according to claim 18, said node further comprising: means for immediately announcing said results of said calculated link metric function as state information in a control message if said results are greater than a pre-determined threshold value.

20. The system according to claim 16, wherein said wireless mesh network is an on-demand network.

21. The system according to claim 20, said node further comprising:
    means for initiating route discovery; and
    means for using said calculated link metric function to generate and maintain a routing table.

22. The system according to claim 16, wherein said wireless mesh network is a hybrid mesh network.

23. The system according to claim 16, wherein said wireless mesh network is based on a tree topology.

24. The system according to claim 23, said node further comprising:
    means for performing one of transmitting a root announcement and initiating a route discovery, including an initialized metric field and a sequence number field;
    means for updating said metric field;
    means for updating said sequence number field; and
    means for updating a routing table.

25. The system according to claim 15, said node further comprising:
    means for determining a media access control and physical layer protocol overhead;
    means for determining a data size;
    means for determining a link data rate periodically;
    means for determining a packet error rate periodically;
    means for determining a weight function for channel utilization; and
    means for determining a weight function for said packet error rate.

26. The system according to claim 25, said node further comprising means for determining channel utilization periodically.

27. The system according to claim 26, said node further comprising:
    means for determining a channel measurement period; and
    means for determining a channel busy time periodically.

28. The system according to claim 15, said node further comprising:
    means for determining a number of quantization levels; and
    means for determining a quantization factor.

29. A node in a wireless network comprising a plurality of nodes, said node configured to participate in the establishment of a bi-directional end-to-end route for data to traverse said wireless network, said node comprising:
    at least one central processing unit;
    a random access memory;
    one or more input/output interfaces; and further comprising:
    means for periodically measuring a quality and a utilization of each channel of said node, said node using multiple channels;
    means for determining a first channel change weight function, said first channel change weight function depending upon frequencies assigned to two consecutive links along said end-to-end route, wherein said first channel change weight function has a value of 1 if all links are weighted equally in terms of channels assigned for transmission and wherein said first channel change weight function has a first predetermined value if a first link of said two consecutive links is a last link in said end-to-end route, a second predetermined value if a first frequency used for said first link of said two consecutive links and a second frequency used for a second link of said two consecutive links are the same, a third predetermined value if said first frequency used for said first link of said two consecutive links is not the same as said second frequency used for said second link of said two consecutive links and nodes associated with each of said two consecutive links use a single radio interface, and a fourth predetermined value if said first frequency used for said first link of said two consecutive links is not the same as said second frequency used for said second link of said two consecutive links and nodes associated with each of said two consecutive links use multiple radio interfaces;
    means for determining a second channel change weight function, said second channel change weight function depending upon frequencies assigned to two consecutive links along said end-to-end route, wherein said second channel change weight function has a value of 0 if all links are weighted equally in terms of channels assigned for transmission and wherein said second channel change weight function has a first predetermined value if a first link of said two consecutive links is a last link in said end-to-end route, a second predetermined value if a first frequency used for said first link of said two consecutive links and a second frequency used for a second link of said two consecutive links are the same, a third predetermined value if said first frequency used for said first link of said two consecutive links is not the same as said second frequency used for said second link of said two consecutive links and nodes associated with each of said two consecutive links use a single radio interface, and a fourth predetermined value if said first frequency used for said first link of said two consecutive links is not the same as said second frequency used for said second link of said two consecutive links and nodes associated with each of said two consecutive links use multiple radio interfaces; means for periodically calculating routing metrics using said measured quality and utilization of said each channel, wherein said routing metrics include a link metric function, a quantized link metric function and a quantized route metric function, and wherein said link metric function uses media access control and physical layer protocol overhead and data size in said link metric function calculation, wherein said quantized route metric is determined by applying said first channel change weight function and said second channel change weight function to said quantized link metric function;
    means for periodically updating a routing table with said calculated routing metrics;
    means for selecting said bi-directional end-to-end route for data to traverse said wireless network based on said routing table.

30. The node according to claim 29, wherein said node has at least one radio interface.

* * * * *